US006816240B1

United States Patent
Camp et al.

(10) Patent No.: US 6,816,240 B1
(45) Date of Patent: Nov. 9, 2004

(54) IMAGE FORMING DEVICE HAVING A PHOTOBLEACH SYSTEM

(75) Inventors: Alphonse D. Camp, Rochester, NY (US); John L. Pawlak, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/621,785

(22) Filed: Jul. 17, 2003

(51) Int. Cl.[7] .......................... G03B 27/72; G03B 27/00
(52) U.S. Cl. .......................... 355/400; 355/27; 355/30; 355/69; 355/405; 430/138
(58) Field of Search .................. 355/400, 405, 355/38, 40, 41, 67–71, 27–30; 430/138, 339

(56) References Cited

U.S. PATENT DOCUMENTS

| 4,766,050 A | * | 8/1988 | Jerry .......................... 430/138 |
| 4,772,530 A | | 9/1988 | Gottschalk et al. |
| 4,772,541 A | | 9/1988 | Gottschalk et al. |
| 4,800,149 A | | 1/1989 | Gottschalk et al. |
| 4,842,980 A | | 6/1989 | Gottschalk et al. |
| 4,865,942 A | | 9/1989 | Gottschalk et al. |
| 5,057,393 A | | 10/1991 | Shanklin et al. |
| 5,100,755 A | | 3/1992 | Shanklin |
| 5,153,104 A | * | 10/1992 | Rossman et al. .......... 430/339 |
| 5,783,353 A | | 7/1998 | Camillus et al. |
| 5,884,114 A | | 3/1999 | Iwasaki |
| 6,229,558 B1 | | 5/2001 | Saigo et al. |
| 6,483,575 B1 | | 11/2002 | Allen et al. |
| 2002/0045121 A1 | | 4/2002 | Higuchi et al. |

FOREIGN PATENT DOCUMENTS

WO    01/77752    10/2001

* cited by examiner

Primary Examiner—D. Rutledge
(74) Attorney, Agent, or Firm—David A. Novais

(57) ABSTRACT

The present invention relates to an image-forming device for processing photosensitive media. The photosensitive media is of the type that includes microcapsules that encapsulate imaging material such as coloring material. The image-forming device includes a photobleaching system that is adapted to eliminate or minimize undesired coloration in a final print.

14 Claims, 4 Drawing Sheets

IMAGE FORMING DEVICE HAVING A PHOTOBLEACH SYSTEM

FIELD OF THE INVENTION

The present invention relates to an image forming device for processing photosensitive media, wherein the photosensitive media includes a plurality of microcapsules that encapsulate imaging material such as coloring material. More specifically, the present invention relates to an image-forming device that includes a photobleach system that is adapted to eliminate or minimize undesired coloration in a final print.

BACKGROUND OF THE INVENTION

Image forming devices are known in which media having a layer of microcapsules containing a chromogenic material and a photohardenable or photosoftenable composition, and a developer, which may be in the same or a separate layer from the microcapsules, is image-wise exposed. In these devices, the microcapsules are ruptured, and an image is produced by the differential reaction of the chromogenic material and the developer. More specifically, in these image-forming devices, after exposure and rupture of the microcapsules, the ruptured microcapsules release a color-forming agent, whereupon the developer material reacts with the color-forming agent to form an image. The image formed can be viewed through a transparent support or a protective overcoat against a reflective white support as is taught in, for example, U.S. Pat. No. 5,783,353 and U.S. Publication No. 2002/0045121 A1. Typically, the microcapsules will include three sets of microcapsules sensitive respectively to red, green and blue light and containing cyan, magenta and yellow color formers, respectively, as taught in U.S. Pat. No. 4,772,541. Preferably a direct digital transmission imaging technique is employed using a modulated LED print head to expose the microcapsules.

Conventional arrangements for developing the image formed by exposure in these image-forming devices include using spring-loaded balls, micro wheels, micro rollers or rolling pins, and heat from a heat source is applied after processing to accelerate development.

The photohardenable composition in at least one and possibly all three sets of microcapsules can be sensitized by a photo-initiator such as a cationic dye-borate complex as described in, for example, U.S. Pat. Nos. 4,772,541; 4,772,530; 4,800,149; 4,842,980; 4,865,942; 5,057,393; 5,100,755 and 5,783,353. Because the cationic dye-borate anion complexes absorb at wavelengths greater than 400 nm, they are colored and the unexposed dye complex present in the microcapsules in the non-image areas can cause undesired coloration in the background area of the final print or picture. That is, the print typically exhibits an obvious overall coloration caused by the residual photo-initiator. Typically, the mixture of microcapsules is greenish and can give the background areas a greenish tint. Although exposure to room light will serve to bleach out the photo-initiator over time, the print quality immediately after processing could appear to be of poor quality.

A conventional approach to prevent or reduce this undesired coloration in the background as well as the developed image include reducing the amount of photoinitiator used and adjusting the relative amounts of cyan, magenta and yellow microcapsules. The problem with this approach is that while this can mitigate the unwanted coloration, photobleaching of the photoinitiator must necessarily be much slower than the photobleaching or photo-softening reaction.

Another issue with respect to providing photobleaching relates to robustness and cost. Typically, a conventional compact portable printer for photosensitive microcapsule type print media does not contain user serviceable components and conventional white light sources such as incandescent lamps or florescent tubes may fail and need replacement over the useful life of the printer. Further, the electroluminescent panel in these devices may not provide enough energy to provide a photo-bleaching action, or may be too costly for the printer.

SUMMARY OF THE INVENTION

The present invention addresses the above-mentioned drawbacks by providing for an image forming device for processing photosensitive media that includes a plurality of microcapsules, wherein the image forming device comprises a photo-bleach system, mechanism or assembly that is adapted to eliminate or minimize undesired coloration in a final print caused by residual photo-initiators. The present invention further provides for a method of reducing or eliminating undesired overall coloration in a print caused by residual photo-initiators.

The device and method of the present invention involves the construction of a non-image forming second LED print head (a photo-bleaching LED print head) located downstream of an exposure LED print head (with respect to the media conveying direction); and the association of the second LED print head with a processing section and/or the exposure LED print head of the image forming device. The second LED print head comprises at least one R, G, and B LED, wherein each LED is fully on during a photo-bleach step and would not require modulation or specific spot shaping as would be required by an image forming exposure LED print head.

The second LED print head is preferably co-joined to or associated with the processing assembly of the image-forming device to permit a bi-directional scanning of the second LED print head without additional drive components. The second LED print head serves to photo-bleach the print prior to the print exiting the body of the image-forming device to provide for an immediate satisfactory print in which undesired coloration has been bleached out.

The present invention therefore relates to an image forming device which comprises an imaging member adapted to form a latent image on a photosensitive medium, with the photosensitive medium comprising a plurality of microcapsules which encapsulate imaging material; a processing assembly adapted to develop the latent image; and a non-imaging member adapted to apply light onto said developed latent image to apply a photo-bleaching effect to the latent image and reduce overall undesired coloration in the latent image.

The present invention further relates to an image forming method which comprises the steps of exposing a photosensitive medium comprising a plurality of microcapsules which encapsulate imaging material to form a latent image, with the exposing step comprising applying a first light beam onto the photosensitive medium; developing the latent image; and photobleaching the photosensitive medium by applying a second light beam to the exposed and developed photosensitive medium, with said second light beam being adapted to bleach out undesired coloration resulting from the exposing step.

The present invention further relates to an image forming device which comprises an imaging member adapted to form a latent image on a photosensitive medium, with the photosensitive medium comprising a plurality of microcapsules which encapsulate imaging material; a processing assembly adapted to develop the latent image; and a non-imaging member adapted to apply non-visible energy onto the developed latent image to apply a photo-bleaching effect to the latent image and reduce overall undesired coloration in the latent image.

The present invention further relates to an image forming method which comprises the steps of exposing a photosensitive medium comprising a plurality of microcapsules which encapsulate imaging material to form a latent image; developing the latent image; and photobleaching the photosensitive medium by applying non-visible energy to the exposed and developed photosensitive medium to bleach out undesired coloration resulting from the exposing step.

DETAILED DESCRIPTION OF THE INVENTION

Figure 1A:
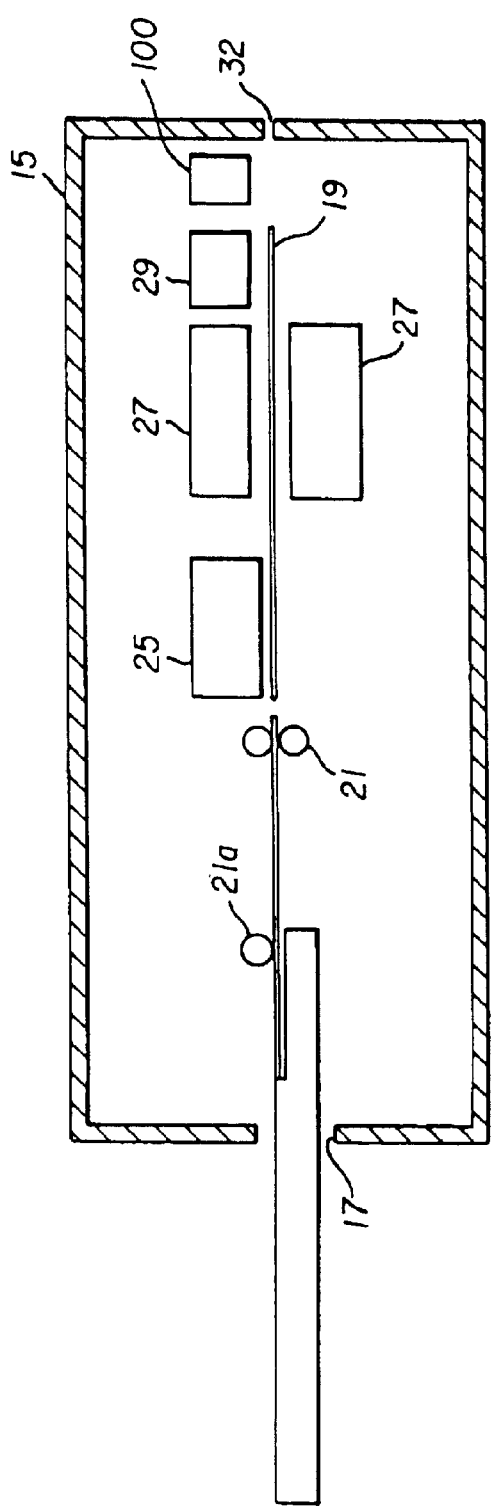
FIG. 1A schematically shows an image-forming device in accordance with the present invention.

Referring now to the drawings, wherein like reference numerals represent identical or corresponding parts throughout the several views, FIG. 1A is a schematic view of an image-forming device 15 of the present invention. Image forming device 15 could be, for example, a printer that includes an opening 17 which is adapted to receive a cartridge containing photosensitive media. As described in U.S. Pat. No. 5,884,114, the cartridge could be a light tight cartridge in which photosensitive sheets are piled one on top of each other. When inserted into image forming device 15, a feed mechanism which includes, for example, a feed roller 21a in image forming device 15, working in combination with a mechanism in the cartridge, cooperate with each other to pull one sheet at a time from the cartridge into image forming device 15 in a known manner. Although a cartridge type arrangement is shown, the present invention is not limited thereto. It is recognized that other methods of introducing media into to the image-forming device such as, for example, individual media feed or roll feed are applicable to the present invention.

Once inside image forming device 15, photosensitive media travels along media path 19, and is transported by, for example, drive rollers 21 connected to, for example, a driving mechanism such as a motor. The photosensitive media will pass by an imaging member 25 in the form of an imaging head which could include a plurality of light emitting elements (LEDs) that are effective to expose a latent image on the photosensitive media based on image information. After the latent image is formed, the photosensitive media is conveyed past a processing assembly or a development member 27. Processing assembly 27 could be a pressure applicator or pressure assembly, wherein an image such as a color image is formed based on the image information by applying pressure to microcapsules having imaging material encapsulated therein to crush the microcapsules. The pressure could be applied by way of spring-loaded balls, micro wheels, micro rollers, rolling pins, etc.

Figure 1B:
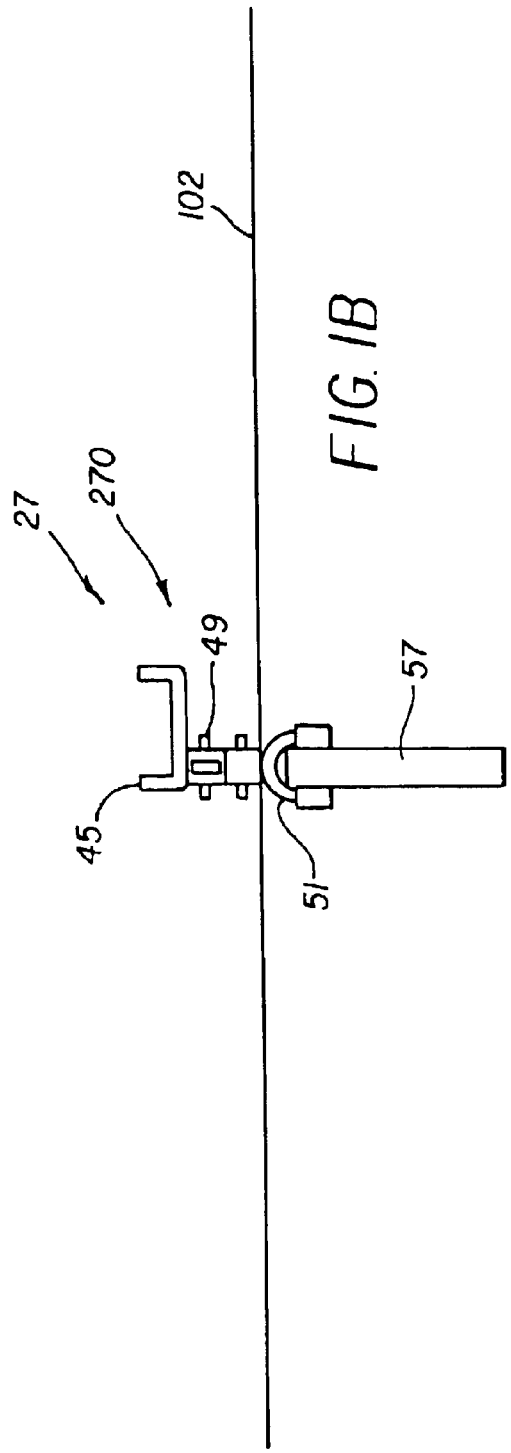
FIG. 1B schematically shows an example of a pressure applying system which can be used in the image-forming device of the present invention.

FIG. 1B schematically illustrates an example of a pressure applicator 270 for processing assembly 27 which can be used in the image-forming device of the present invention. In the example of FIG. 1B, pressure applicator 270 is a crushing roller arrangement that provides a point contact on photosensitive medium 102. More specifically, pressure applicator 270 includes a support 45 that extends along a width-wise direction of photosensitive medium 102. Moveably mounted on support 45 is a crushing roller arrangement 49 that is adapted to move along the length of support 45, i.e., across the width of photosensitive medium 102. Crushing roller arrangement 49 is adapted to contact one side of photosensitive medium 102. A beam or roller type member 51 is positioned on an opposite side of photosensitive medium 102 and can be provided on a support or spring member 57. Beam or roller type member 51 is positioned so as to contact the opposite side of photosensitive medium 102 and is located opposite crushing roller arrangement 49. Beam or roller type member 51 and crushing roller arrangement 49 when in contact with photosensitive medium 102 on opposite sides provide a point contact on photosensitive medium 102. Crushing roller arrangement 49 is adapted to move along a width-wise direction of photosensitive material 102 so as to crush microcapsules and release coloring material. Further examples of pressure applicators or crushing members which can be used in the image-forming device of the present invention are described in U.S. Pat. Nos. 6,483,575 and 6,229,558.

Within the context of the present invention, the imaging material comprises a coloring material (which is used to form images) or material for black and white media. After the formation of the image, the photosensitive media is conveyed past heater 29 for fixing the image on the media. After processing assembly 27 and heater 29, the media is conveyed past a non-imaging member 100 in the form of a second LED print head which is actuated or turned on during a photobleaching process or step. In a through-feed unit, the photosensitive media could thereafter be withdrawn through an exit 32. As a further option, image-forming device 15 can be a return unit in which the photosensitive media is conveyed or returned back to opening 17.

Figure 2A:
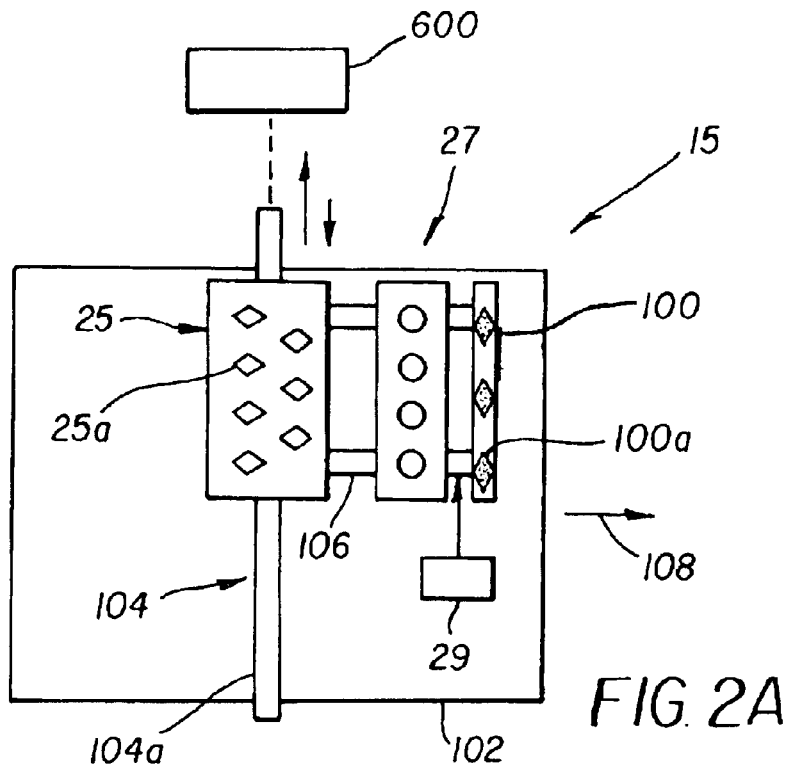
FIG. 2A is a top schematic view of one embodiment of the image-forming device in accordance with the present invention.

As shown in FIG. 2A, in a first feature of the present invention, imaging member 25 as well as processing assembly 27 are mounted on a movement device 104 associated with a drive motor 600 or an equivalent drive device. Movement device 104 in cooperation with motor 600 are adapted to move imaging member 25 and processing assembly 27 as a unit in a direction transverse to a conveying direction 108 of media 102 so as to scan media 102. As described above, due to residual photoinitiators, the print will include an undesired overall coloration. As illustrated in FIG. 2A, in a first embodiment of the present invention, image-forming device 15 includes non-imaging member 100 in the form of a second LED exposure head. In the embodiment of FIG. 2A, non-imaging member 100 is located downstream of processing assembly 27 with respect to direction of travel 108 of media 102 and is also mounted on movement device 104. Movement device 104 could comprise a support structure 106 and a rotatably mounted motor driven lead screw 104a or some other type of linear conveying mechanism such as belts, gears, racks, etc. that is adapted to support and drive imaging member 25, processing assembly 27 and non-imaging member 100 as a unit. Upon actuation of movement device 104 all three members 25, 27, 100 move as a unit in a direction transverse to moving direction 108 of media 102.

Therefore, during use of the embodiment of FIG. 2A, after media 112 passes processing assembly 27 it is conveyed past non-imaging member 100. Non-imaging member 100 which is constructed as an LED print head that comprises at least one R, G and B LED 100a is adapted to direct a visible light beam or non-visible energy (depending on the nature of the photoinitiator) onto the exposed and developed media. Therefore, as one example, the LEDs or energy source could be of the type that emits visible light from red, green and blue emitting sources. As an example, the system could be 638 nm red, 525 nm green and 450 nm blue, however, the present invention is not limited to these values and other values that are adapted to emit visible red, green and blue light can be used. As an alternative option, depending on the nature of the photoinitiator, the LED's or energy source could be adapted to emit non-visible energy.

The photons from the LEDs of non-imaging member 100 cause the release of radicals which accordingly causes a reduction of the photoinitiators and thus serves to bleach out the photoinitiators. This therefore eliminates the undesired coloration described above while leaving the dye image intact. Further, since non-imaging member 100 is not utilized as an image-forming device, non-imaging member 100 does not require modulation or spot shaping. An advantage of the structure of FIG. 2A is that all of the elements (imaging member 25, processing assembly 27 and non-imaging member 100) are mounted for movement as a unit. This eliminates the need for extra movement members and helps to synchronize the movement of all three elements.

Figure 2B:
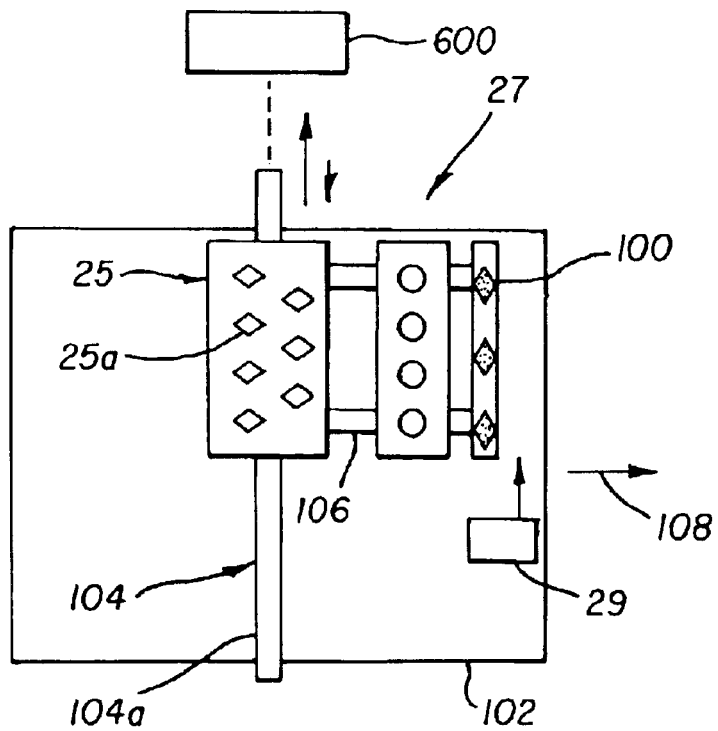
FIG. 2B is a further embodiment of the device of FIG. 2A.

Further, the application of heat by heater 29 could occur prior to the photobleaching step as shown in FIGS. 1A and 2A or after the photobleach step as shown in FIG. 2B. Essentially, in one embodiment of the invention, the process involves a sequence as shown in FIGS. 1A and 2A that includes an exposure step (through LEDs 25a of imaging member 25), a hold step, a crushing or pressure applying step (processing assembly 27), a hold step, a post heat step (heater 29) and a photobleach step (non-imaging member 100). However, the present invention is not limited to this sequence and it is recognized that the photobleach step can occur before the post heat step as shown in FIG. 2B. The embodiment of FIG. 2B is similar to the embodiment of FIG. 2A with the position heater 29 and non-imaging member 100 being reversed from the position of FIG. 2A. Therefore, in FIG. 2B, after the media is conveyed past processing assembly 27 it undertakes a photobleaching by non-imaging member 100 and thereafter a post heating by heater 29 occurs.

Figure 3:
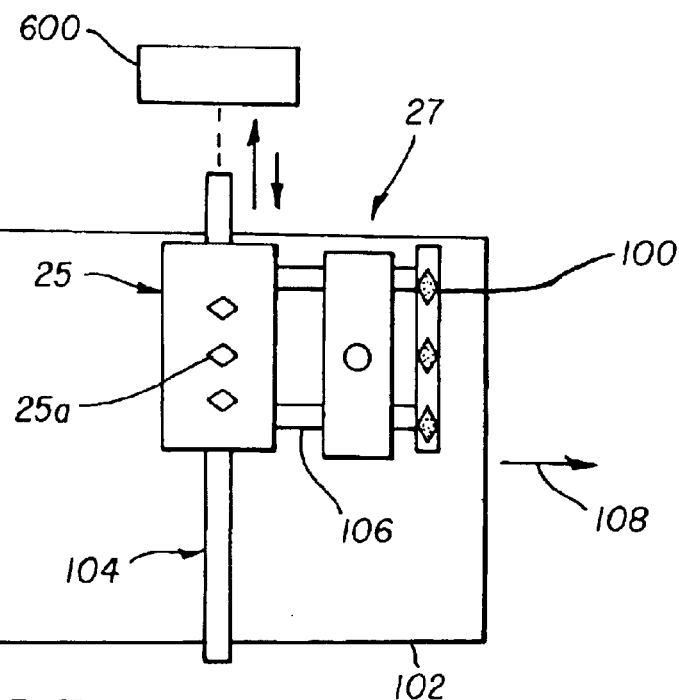
FIG. 3 is a top schematic view of a further embodiment of the image-forming device in accordance with the present invention.

The embodiment of FIG. 3 is similar to the embodiment of FIG. 2A, however, in FIG. 3, imaging member 25 utilizes a reduced number of LEDs 25a such that less lines are scanned on a single pass than in the embodiment of FIG. 2A. Along with a reduced number of LEDs, the embodiment of FIG. 3 can also include a reduced number of, for example, pressure applying members in the processing assembly. Although not shown in FIG. 3, as in the previous embodiment, in the embodiment of FIG. 3 the post heating can occur before or after photobleaching.

Figure 4:
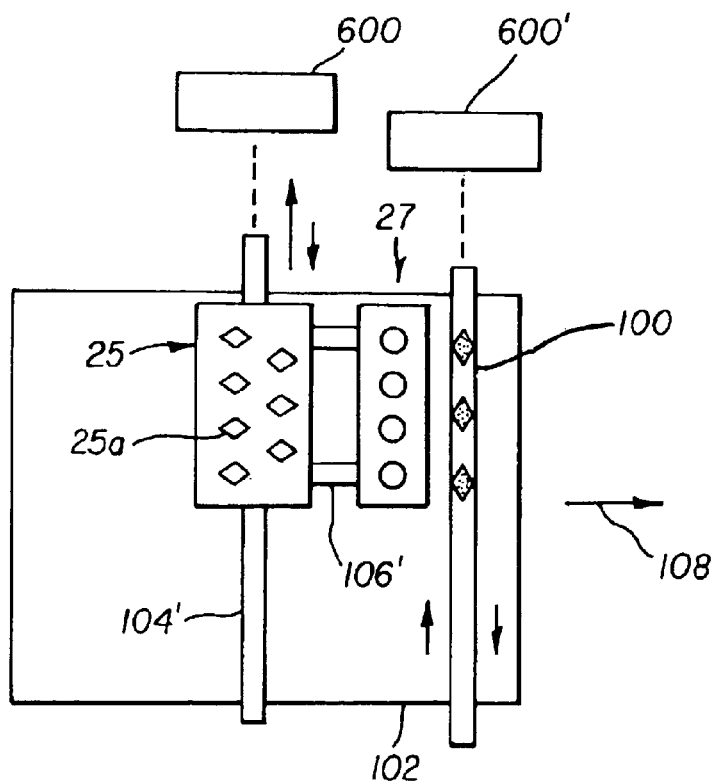
FIG. 4 is a top schematic view of a still further embodiment of the image forming device in accordance with the present invention.

The embodiment of FIG. 4 includes imaging member 25 and processing assembly 27 similar to the embodiment of FIG. 2A. Further, like the embodiment of FIG. 2A, imaging member 25 and processing assembly 27 are mounted as a unit on a support structure 106' and a movement device 104' driven by motor 600 for linear movement in a direction transverse to direction of movement 108 of media 102. The difference with respect to the embodiment of FIG. 4 is that non-imaging member 100 is not mounted as a unit with imaging member 25 and processing assembly 27. More specifically, in the embodiment of FIG. 4, non-imaging member 100 is mounted on a separate movement device driven by further motor 600' for linear movement in a direction transverse to movement direction 108 of media 102. With the embodiment of FIG. 4, imaging member 25 and processing assembly 27 can be controlled as a unit to expose and develop the image, and thereafter, non-imaging member 100 can be separately controlled in a photobleach step to apply light on the media and bleach out the undesired coloration. Although not shown in FIG. 4, as in the previous embodiments, the post heating in the embodiment of FIG. 4 can occur before or after photobleaching.

Figure 5:
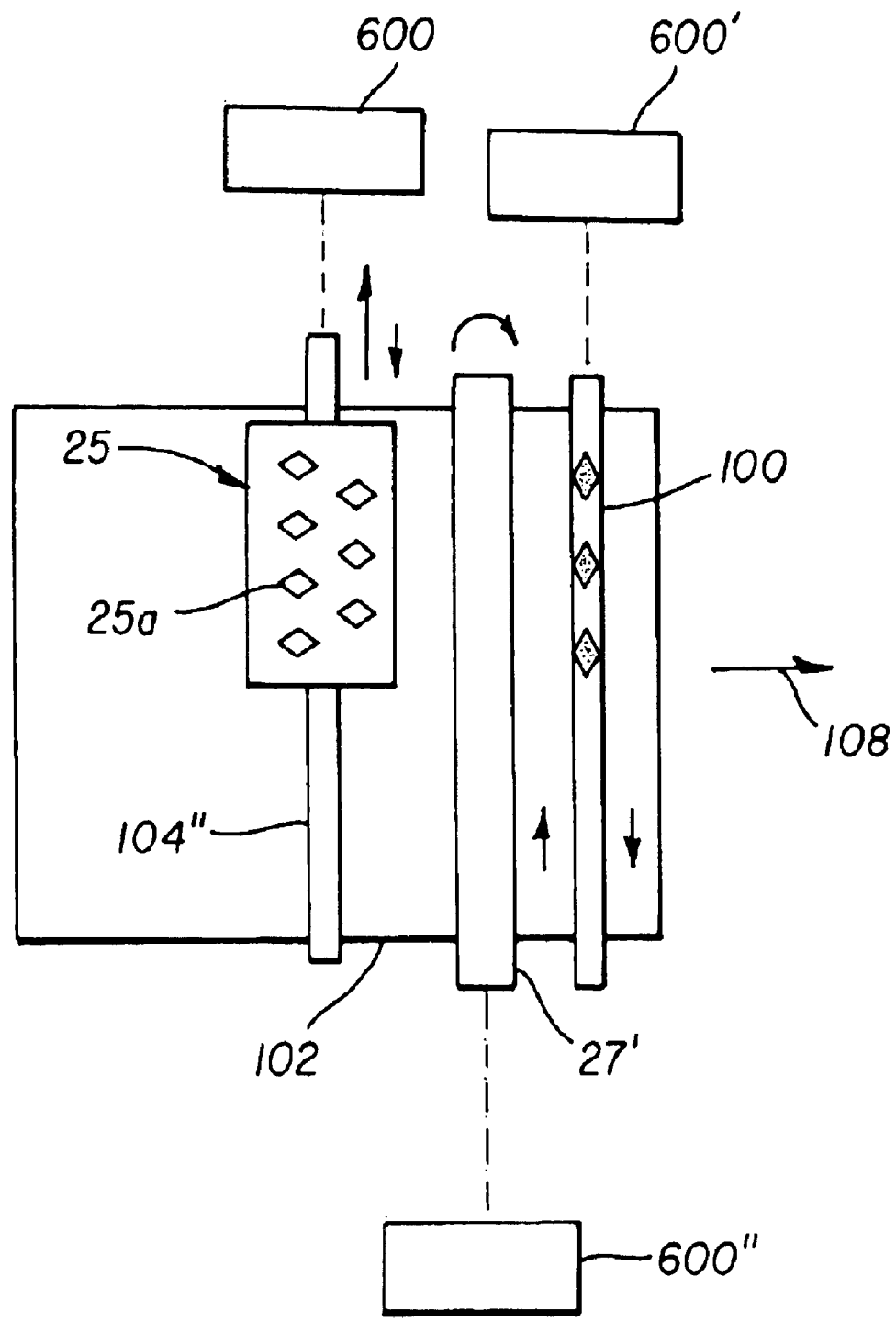
FIG. 5 is a top schematic view of a still further embodiment of the image-forming device of the present invention.

FIG. 5 illustrates a further embodiment in which a processing assembly 27 is in the form of a rolling pin type crusher 27'. When using a rolling pin type crusher, it is preferable that the elements (imaging member 25, processing assembly 27 and non-imaging member 100) not be joined. Imaging member 25 in FIG. 5 is mounted on movement device 104" which is similar to movement devices 104 and 104' but dedicated to imaging member 25. Therefore, in the embodiment of FIG. 5, motors 600 and 600' are respectively associated with imaging member 25 and non-imaging member 100 similar to the embodiment of FIG. 4, wherein the members are adapted to move in at least a direction transverse to the direction of movement of the media. In addition, rolling pin type crusher 27' is separately driven by a further motor 600". Further, as in the previous embodiments, in the embodiment of FIG. 5, post-heating can occur before or after photobleaching.

Also, as described, non-imaging member 100 could include a visible light exposing source or a non-visible energy source. For example, if a non-visible exposing source is used for imaging member 25 (such as IR false sensitization that drives a different photoinitiator), then a corresponding and appropriate LED non-visible light source would be used for non-imaging member 100. In essence, depending on the nature of the photoinitiator, either a visible light emitting or non-visible energy-emitting source could be used in non-imaging member 100 of the present invention. Further, although LED's are described as the light or energy source, the present invention is not limited thereto. It is recognized that any source of light or energy such as, for example, fluorescent, incandescent, luminescent panel, etc, can be used as the light or energy source in the present invention.

Therefore, the present invention provides for a device and method for photobleaching media. The device and method utilizes a non-imaging member in the form of a second print head (for example, a photo-bleaching LED print head) located downstream of an exposure LED print head (with respect to the media conveying direction). The second print head can comprise at least one R, G, B LED, wherein each LED would be fully on during the photo-bleach step and would not require modulation or specific spot shaping as required by the exposure LED print head. The light or energy from the non-imaging member is applied to the exposed and developed media to bleach out and eliminate undesired coloration while leaving the dye image intact The invention has been described in detail with particular reference to certain preferred embodiments thereof, but it will be understood that variations and modifications can be effected within the spirit and scope of the invention.

What is claimed is:

1. An image forming device comprising:

an imaging member adapted to form a latent image on a photosensitive medium, the photosensitive medium comprising a plurality of microcapsules which encapsulate imaging material;

a processing assembly adapted to develop the latent image; and a non-imaging member adapted to apply light onto said developed latent image to apply a photo-bleaching effect to the latent image and reduce overall undesired coloration in the latent image.

2. An image forming device according to claim 1, wherein said imaging member is an image forming LED print head and said non-imaging member is a non-image forming LED print head.

3. An image forming device according to claim 1, wherein said processing assembly is a pressure applying member adapted to apply pressure to said microcapsules.

4. An image forming device according to claim 1, further comprising a heater located upstream of said non-imaging member with respect to a direction of travel of said photosensitive medium.

5. An image forming device according to claim 1, further comprising a heater located downstream of said non-imaging member with respect to a direction of travel of said photosensitive medium.

6. An image forming device according to claim 1, further comprising a movement device adapted to support said imaging member and move said imaging member in a direction transverse to a direction of travel of said photosensitive medium.

7. An image forming device according to claim 6, wherein said movement device is further adapted to support said processing assembly to permit said processing assembly and said imaging member to move as a unit along said transverse direction.

8. An image forming device according to claim 6, wherein said movement device is further adapted to support said processing assembly and said non-imaging member to permit to permit said imaging member, said processing assembly and said non-imaging member to move as a unit along said transverse direction.

9. An image forming device according to claim 1, further comprising a first movement device adapted to move said imaging member and said processing assembly as a unit in a direction transverse to a direction of travel of said photosensitive medium, and a second movement device adapted to move said non-imaging member in said transverse direction.

10. An image forming method comprising the steps of:

exposing a photosensitive medium comprising a plurality of microcapsules which encapsulate imaging material to form a latent image, said exposing step comprising applying a first light beam onto said photosensitive medium;

developing the latent image; and photobleaching said photosensitive medium by applying a second light beam to said exposed and developed photosensitive medium, said second light beam being adapted to bleach out undesired coloration resulting from said exposing step.

11. An image forming method according to claim 10, comprising the further step of:

post-heating said photosensitive medium before said photobleaching step.

12. An image forming method according to claim 10, comprising the further step of:

post-heating said photosensitive medium after said photobleaching step.

13. An image forming device comprising:

an imaging member adapted to form a latent image on a photosensitive medium, the photosensitive medium comprising a plurality of microcapsules which encapsulate imaging material;

a processing assembly adapted to develop the latent image; and a non-imaging member adapted to apply non-visible energy onto said developed latent image to apply a photo-bleaching effect to the latent image and reduce overall undesired coloration in the latent image.

14. An image forming method comprising the steps of:

exposing a photosensitive medium comprising a plurality of microcapsules which encapsulate imaging material to form a latent image;

developing the latent image; and photobleaching said photosensitive medium by applying non-visible energy to said exposed and developed photosenitive medium to bleach out undesired coloration resulting from said exposing step.

* * * * *